(12) United States Patent
Akazawa

(10) Patent No.: US 9,608,504 B2
(45) Date of Patent: Mar. 28, 2017

(54) VIBRATION-BASED ELECTRIC POWER GENERATOR

(75) Inventor: Teruyuki Akazawa, Kyoto (JP)

(73) Assignee: YANMAR CO., LTD., Osaka (JP)

( * ) Notice: Subject to any disclaimer, the term of this patent is extended or adjusted under 35 U.S.C. 154(b) by 646 days.

(21) Appl. No.: 14/003,928

(22) PCT Filed: Mar. 26, 2012

(86) PCT No.: PCT/JP2012/002058
§ 371 (c)(1),
(2), (4) Date: Sep. 9, 2013

(87) PCT Pub. No.: WO2012/132378
PCT Pub. Date: Oct. 4, 2012

(65) Prior Publication Data
US 2013/0342036 A1    Dec. 26, 2013

(30) Foreign Application Priority Data
Mar. 31, 2011    (JP) ................................ 2011-078143

(51) Int. Cl.
*H02K 7/18*    (2006.01)
*H02K 35/02*    (2006.01)
*H02K 35/04*    (2006.01)

(52) U.S. Cl.
CPC ........... *H02K 35/02* (2013.01); *H02K 7/1876* (2013.01); *H02K 35/04* (2013.01)

(58) Field of Classification Search
CPC ....... H02K 35/02; H02K 35/04; H02K 7/1876
See application file for complete search history.

(56) References Cited

U.S. PATENT DOCUMENTS 5,175,457 A * 12/1992 Vincent .................. H02K 35/02
                                                        310/12.12
6,127,750 A * 10/2000 Dadd ...................... H02K 33/16
                                                        310/13
(Continued)

FOREIGN PATENT DOCUMENTS

JP    11-262234    9/1999
JP    2009-171796    7/2009
(Continued)

OTHER PUBLICATIONS

Supplementary European Search Report for corresponding European patent application, dated Oct. 16, 2015, 7 pages total.

*Primary Examiner* — Dang Le
(74) *Attorney, Agent, or Firm* — Hamre, Schumann, Mueller & Larson, P.C.

(57) ABSTRACT

The present invention provides a The vibration-based electric power generator in which one of ends of a magnet holding member 20 and one of ends of an outer yoke 30 are connected to each other through a first support spring 41 which is a leaf spring, the other end of the magnet holding member 20 and the other end of the first support spring 41 are connected to each other through a second support spring 42 which is a leaf spring, and the outer yoke 30 or the magnet holding member 20 is fixed to a structure 50 such as a wall surface, a road sign, a vehicle body and a railway bridge for generating electric power from vibration of the structure 50. The vibration-based electric power generator has excellent durability and can generate electric power even by slight vibration.

2 Claims, 9 Drawing Sheets

(56) References Cited

U.S. PATENT DOCUMENTS

| | | | |
|---|---|---|---|
| 7,288,860 B2* | 10/2007 | Cheung | H02K 35/02 290/1 R |
| 2008/0036307 A1* | 2/2008 | Lu | F03G 7/08 310/15 |
| 2008/0282694 A1* | 11/2008 | Kitamura | F02G 1/0435 60/517 |

FOREIGN PATENT DOCUMENTS

| | | |
|---|---|---|
| JP | 2010-15705 | 1/2010 |
| JP | 2010-119222 | 5/2010 |
| JP | 2010-153777 | 7/2010 |
| WO | 2009/127823 | 10/2009 |

* cited by examiner

Transmission of vibration

VIBRATION-BASED ELECTRIC POWER GENERATOR

TECHNICAL FIELD

The present invention relates to a vibration-based electric power generator which is fixed to a structure such as a wall surface, a road sign, a vehicle body and a railway bridge, and which generates electric power from vibration of the structure.

BACKGROUND TECHNIQUE

Solar electric power generation and wind force electric power generation are utilized as an outdoor electric power generator, but there is proposed an electric power generator which generates electric power utilizing pressure energy generated when a people walks or utilizing vibration energy generated when a vehicle or a train runs.

For example, patent document 1 proposes an electric power generating member including: a piezoelectric element having a plate-like piezoelectric ceramics and electrodes formed on both main surfaces of the piezoelectric ceramics; a press member which presses the piezoelectric element from the side of one of the main surfaces; and a support member which supports the piezoelectric element on the side of the other main surface. The support member supports a periphery of the piezoelectric element, and the press member presses the piezoelectric element by its flat press-surface inside of the support member. Therefore, the piezoelectric ceramics is sufficiently bent by pressure energy generated when a people walks or vibration energy generated when a vehicle runs, a large distortion can be obtained and cancellation of generated electric charge can be reduced. Therefore, high electric power can efficiently be obtained.

Patent document 2 discloses an electric power generating street light fixed to a high speed land bridge. This electric power generating street light includes a hollow cylindrical street light body which supports a display unit, and an electric power generating unit disposed in this street body. The electric power generating unit includes a piezoelectric element which generates electric power of the display unit by vibration of the high speed land bridge, and a flexible vibration plate fixed in a direction intersecting with an inner wall of the street light body. The piezoelectric element is fixed to a side surface of the vibration plate.

PRIOR ART DOCUMENTS

Patent Documents

[Patent Document 1] Japanese Patent Application Laid-open No.2010-153777
[Patent Document 2] Japanese Patent Application Laid-open No.2010-15705

DISCLOSURE OF THE INVENTION

Problem to be Solved by the Invention

Patent documents 1 and 2 utilize the piezoelectric element but have a problem in terms of durability.

Hence, it is an object of the present invention to provide a vibration-based electric power generator having excellent durability and capable of generating electric power even by slight vibration.

Means for Solving the Problem

A first aspect of the present invention provides a vibration-based electric power generator comprising a cylindrical inner yoke, a cylindrical magnet holding member disposed on an outer periphery of the inner yoke at a predetermined distance therefrom, and a cylindrical outer yoke disposed on an outer periphery of the magnet holding member at a predetermined distance therefrom, wherein one of ends of the magnet holding member and one of ends of the of outer yoke are connected to each other through a first support spring which is a leaf spring, an other end of the magnet holding member and an other end of the outer yoke are connected to each other through a second support spring which is a leaf spring, and the outer yoke or the magnet holding member is fixed to a structure such as a wall surface, a road sign, a vehicle body and a railway bridge for generating electric power from vibration of the structure.

According to a second aspect of the invention, in the vibration-based electric power generator of the first aspect, the inner yoke and the outer yoke are fixed to the structure, and the magnet holding member moves by vibration of the structure.

According to a third aspect of the invention, in the vibration-based electric power generator of the first aspect, the inner yoke and the magnet holding member are fixed to the structure, and the outer yoke moves by vibration of the structure.

According to a fourth aspect of the invention, in the vibration-based electric power generator of the first aspect, the structure comprises a first structure and a second structure which are physically separated from each other, the outer yoke is fixed to the first structure, and the magnet holding member is fixed to the second structure.

A fifth aspect of the invention provides a vibration-based electric power generator comprising a cylindrical inner yoke having an outer periphery which holds a magnet, and a cylindrical outer yoke disposed on the outer periphery of the inner yoke at a predetermined distance therefrom, wherein one of ends of the inner yoke and one of ends of the outer yoke are connected to each other through a first support spring which is a leaf spring, an other end of the inner yoke and an other end of the outer yoke are connected to each other through a second support spring which is a leaf spring, and the outer yoke or the inner yoke is fixed to a structure such as a wall surface, a road sign, a vehicle body and a railway bridge for generating electric power from vibration of the structure.

According to a sixth aspect of the invention, in the vibration-based electric power generator of the fifth aspect, the outer yoke is fixed to the structure, and the inner yoke moves by vibration of the structure.

According to a seventh aspect of the invention, in the vibration-based electric power generator of the fifth aspect, the structure comprises a first structure and a second structure which are physically separated from each other, the outer yoke is fixed to the first structure, and the inner yoke is fixed to the second structure.

Effect of the Invention

According to the present invention, the magnet holding member and the outer yoke are connected to each other through the support springs. Therefore, it is easy to adjust positions of the magnet holding member and the outer yoke. Further, since the pair of support springs supports the magnet holding member and the outer yoke to sandwich the magnet holding member, magnet holding member can operate without coming into contact with the inner yoke or the outer yoke even at the time of operation.

Figure 1:
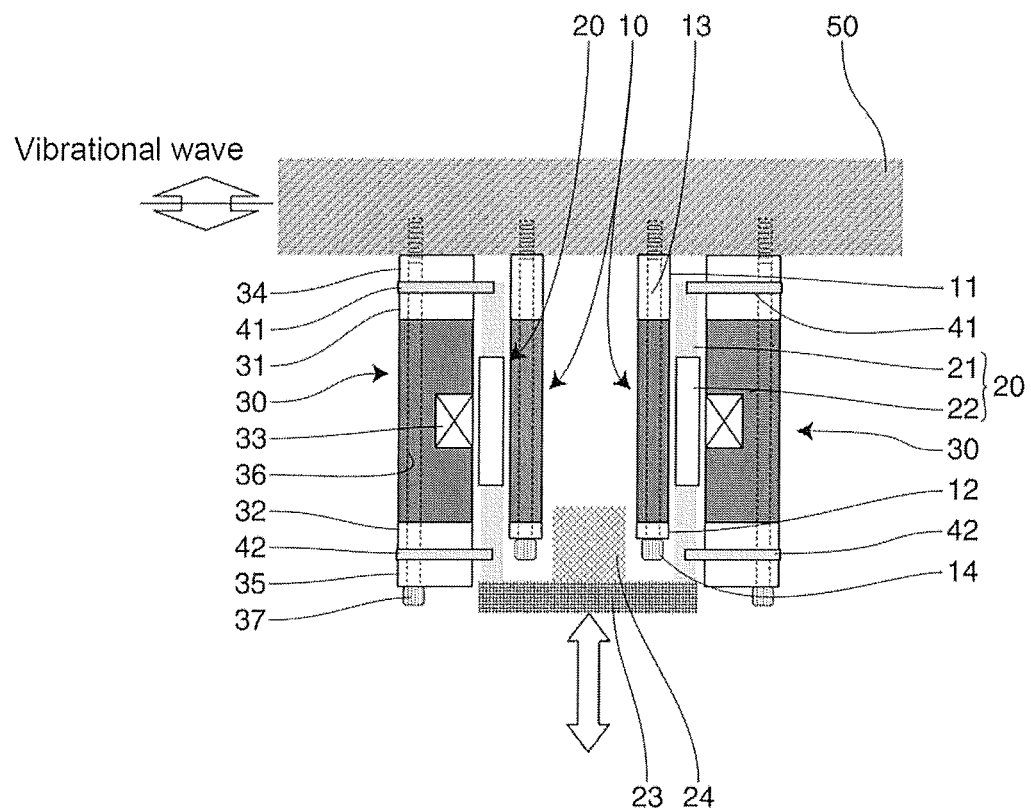
FIG. 1 is a schematic side sectional view of a vibration-based electric power generator according to one embodiment of the present invention.

EXPLANATION OF SYMBOLS 10 inner yoke
20 magnet holding member
22 magnet
30 outer yoke
33 winding
41 first support spring
42 second support spring
50 structure

MODE FOR CARRYING OUT THE INVENTION

In the vibration-based electric power generator of the first aspect of the invention, one of ends of the magnet holding member and one of ends of the of outer yoke are connected to each other through a first support spring which is a leaf spring, an other end of the magnet holding member and an other end of the outer yoke are connected to each other through a second support spring which is a leaf spring, and the outer yoke or the magnet holding member is fixed to a structure such as a wall surface, a road sign, a vehicle body and a railway bridge for generating electric power from vibration of the structure. According to this aspect, by connecting the magnet holding member and the outer yoke to each other through the support spring, it becomes easy to adjust positions of the magnet holding member and the outer yoke. Since the magnet holding member and the outer yoke are supported by the pair of support springs to sandwich the magnet holding member, they can be operated at the time of operation such that the magnet holding member does not come into contact with the inner yoke and the outer yoke.

According to a second aspect of the invention, in the vibration-based electric power generator of the first aspect, the inner yoke and the outer yoke are fixed to the structure, and the magnet holding member moves by vibration of the structure. According to this aspect, since the magnet holding member is made as a movable portion, the magnet holding member can be reduced in weight, and it is possible to generate electric power even by slight vibration, and it is possible to efficiently generate electric power as compared with a case where a coil side is made as a movable portion.

According to a third aspect of the invention, in the vibration-based electric power generator of the first aspect, the inner yoke and the magnet holding member are fixed to the structure, and the outer yoke moves by vibration of the structure. According to this aspect, since the coil side is made as the movable portion, it is possible to stably generate electric power.

According to a fourth aspect of the invention, in the vibration-based electric power generator of the first aspect, the structure comprises a first structure and a second structure which are physically separated from each other, the outer yoke is fixed to the first structure, and the magnet holding member is fixed to the second structure. According to this aspect, as a shock absorber, or by using the shock absorber, it is possible to utilize vibration or shock generated in a vehicle for generating electric power.

A fifth aspect of the invention provides a vibration-based electric power generator comprising a cylindrical inner yoke having an outer periphery which holds a magnet, and a cylindrical outer yoke disposed on the outer periphery of the inner yoke at a predetermined distance therefrom, wherein one of ends of the inner yoke and one of ends of the outer yoke are connected to each other through a first support spring which is a leaf spring, an other end of the inner yoke and an other end of the outer yoke are connected to each other through a second support spring which is a leaf spring, and the outer yoke or the inner yoke is fixed to a structure such as a wall surface, a road sign, a vehicle body and a railway bridge for generating electric power from vibration of the structure. According to this aspect, since the inner yoke an the outer yoke are connected to each other through the support springs, it becomes easy to adjust positions of the inner yoke and the outer yoke, and the inner yoke and the outer yoke are supported by the pair of support springs to sandwich the inner yoke, they can be operated at the time of operation such that the inner yoke does not come into contact with the outer yoke.

According to a sixth aspect of the invention, in the vibration-based electric power generator of the fifth aspect, the outer yoke is fixed to the structure, and the inner yoke moves by vibration of the structure. This embodiment can be utilized for a structure having a large vibration force as compared with a case where the magnet holding member is made as a movable portion.

According to a seventh aspect of the invention, in the vibration-based electric power generator of the fifth aspect, the structure comprises a first structure and a second structure which are physically separated from each other, the outer yoke is fixed to the first structure, and the inner yoke is fixed to the second structure. According to this aspect, as a shock absorber, or by using the shock absorber, it is possible to utilize vibration or shock generated in a vehicle for generating electric power.

[Embodiments]

One of embodiments of the present invention will be described in detail together with drawings.

FIG. 1 is a schematic side sectional view of a vibration-based electric power generator according to the embodiment of the present invention.

The vibration-based electric power generator of the embodiment includes a cylindrical inner yoke 10, a cylindrical magnet holding member 20 disposed on an outer periphery of the inner yoke 10 at a predetermined distance therefrom, and a cylindrical outer yoke 30 disposed on an outer periphery of the magnet holding member 20 at a predetermined distance therefrom.

Cylindrical both end surfaces of the inner yoke 10 include a first base 11 and a second base 12. A plurality of through holes 13 are formed in the inner yoke 10 together with the first base 11 and the second base 12, and fastening bolts 14 are disposed in the through holes 13.

The magnet holding member 20 includes a cylindrical magnet holder 21 and a magnet 22 held by the magnet holder 21. A piston movable-portion 23 is provided on one of end surfaces of the magnet holder 21. The piston movable-portion 23 is provided with an adjustment mass 24. The adjustment mass 24 adjusts natural frequency at which power is taken out most, and adjusts a reciprocating movement range.

Cylindrical both end surfaces of the outer yoke 30 include a first spacer 31 and a second spacer 32, and an inner peripheral side recess of the outer yoke 30 includes a winding 33. The first spacer 31 is provided with a first base 34, and the second spacer 32 is provided with a second base 35.

One end of the magnet holding member 20 and the first spacer 31 existing at one end of the outer yoke 30 are connected to each other through a first support spring 41 which is a leaf spring. The other end of the magnet holding member 20 and the second spacer 32 existing at the other end of the outer yoke 30 are connected to each other through a second support spring 42 which is a leaf spring.

A plurality of through holes 36 are formed in the outer yoke 30 together with the first spacer 31, the second spacer 32, the first base 34 and the second base 35. Fastening bolts 37 are disposed in the through holes 36.

The first support spring 41 and the second support spring 42 are mounted on the outer yoke 30 through the fastening bolt 37.

In this embodiment, the inner yoke 10 and the outer yoke 30 are fixed to a structure 50 through the fastening bolts 14 and 37, and the magnet holding member 20 relatively reciprocates with respect to the inner yoke 10 and the outer yoke 30 by vibration of the structure 50, thereby generating electric power.

The structure 50 is a wall surface, a road sign, a vehicle body or a railway bridge, and receives vibration transmitted by wind pressure, running of a vehicle or a train or walking of a people.

According to this embodiment, the magnet holding member 20 and the outer yoke 30 are connected to each other through the support springs 41 and 42, it is easy to adjust positions of the magnet holding member 20 and the outer yoke 30, the magnet holding member 20 and the outer yoke 30 are supported by the pair of support springs 41 and 42 to sandwich the magnet holding member 20, and they can be operated at the time of operation such that the magnet holding member 20 does not come into contact with the inner yoke 10 and the outer yoke 30.

According to the embodiment, since the magnet holding member 20 is made as a movable portion, the magnet holding member 20 can be reduced in weight, electric power can be generated even by slight vibration, and it is possible to generate electric power efficiently as compared with a case where a coil side is made as a movable portion.

Figure 2:
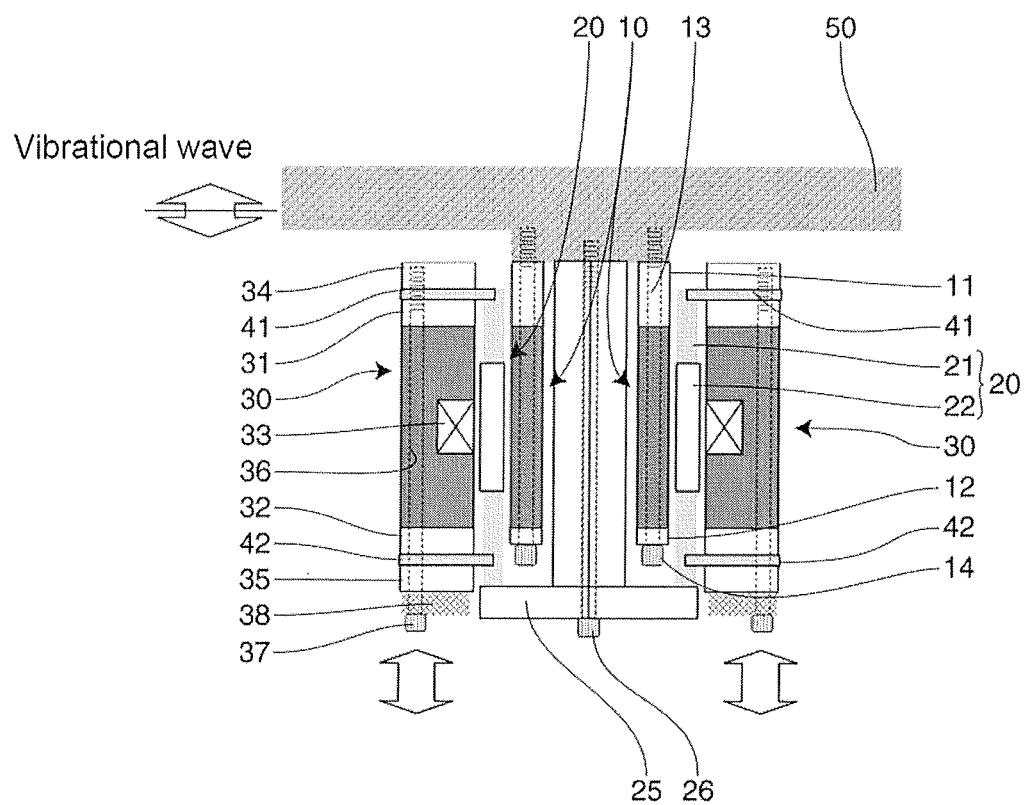
FIG. 2 is a schematic side sectional view of a vibration-based electric power generator according to another embodiment of the invention.

FIG. 2 is a schematic side sectional view of a vibration-based electric power generator according to another embodiment of the invention. The same symbols are allocated to the same members as those of the previous embodiment, and explanation thereof will be omitted.

In this embodiment, the inner yoke 10 and the magnet holding member 20 are fixed to the structure 50, and the outer yoke 30 can be moved by vibration of the structure 50.

One of end surfaces of the magnet holder 21 is provided with a piston-fixing portion 25. The piston-fixing portion 25 is fixed to the structure 50 through a fastening bolt 26.

The fastening bolt 37 connects the outer yoke 30 to the first spacer 31, the second spacer 32, the first base 34 and the second base 35, but does not fasten the outer yoke 30 to the structure 50. The second base 35 is provided with an adjusting mass 38. The adjustment mass 38 adjusts natural frequency at which power is taken out most, and adjusts a reciprocating movement range.

In this embodiment, the inner yoke 10 and the magnet holding member 20 are fixed to a structure 50 through the fastening bolts 14 and 26, and the outer yoke 30 relatively reciprocates with respect to the inner yoke 10 and the magnet holding member 20 by vibration of the structure 50, thereby generating electric power.

According to this embodiment, the magnet holding member 20 and the outer yoke 30 are connected to each other through the support springs 41 and 42, it is easy to adjust positions of the magnet holding member 20 and the outer yoke 30, the magnet holding member 20 and the outer yoke 30 are supported by the pair of support springs 41 and 42 to sandwich the magnet holding member 20, and they can be operated at the time of operation such that the magnet holding member 20 does not come into contact with the inner yoke 10 and the outer yoke 30.

According to this embodiment, since the outer yoke 30 is made as a movable portion, it is possible to stably generate electric power.

Figure 3:
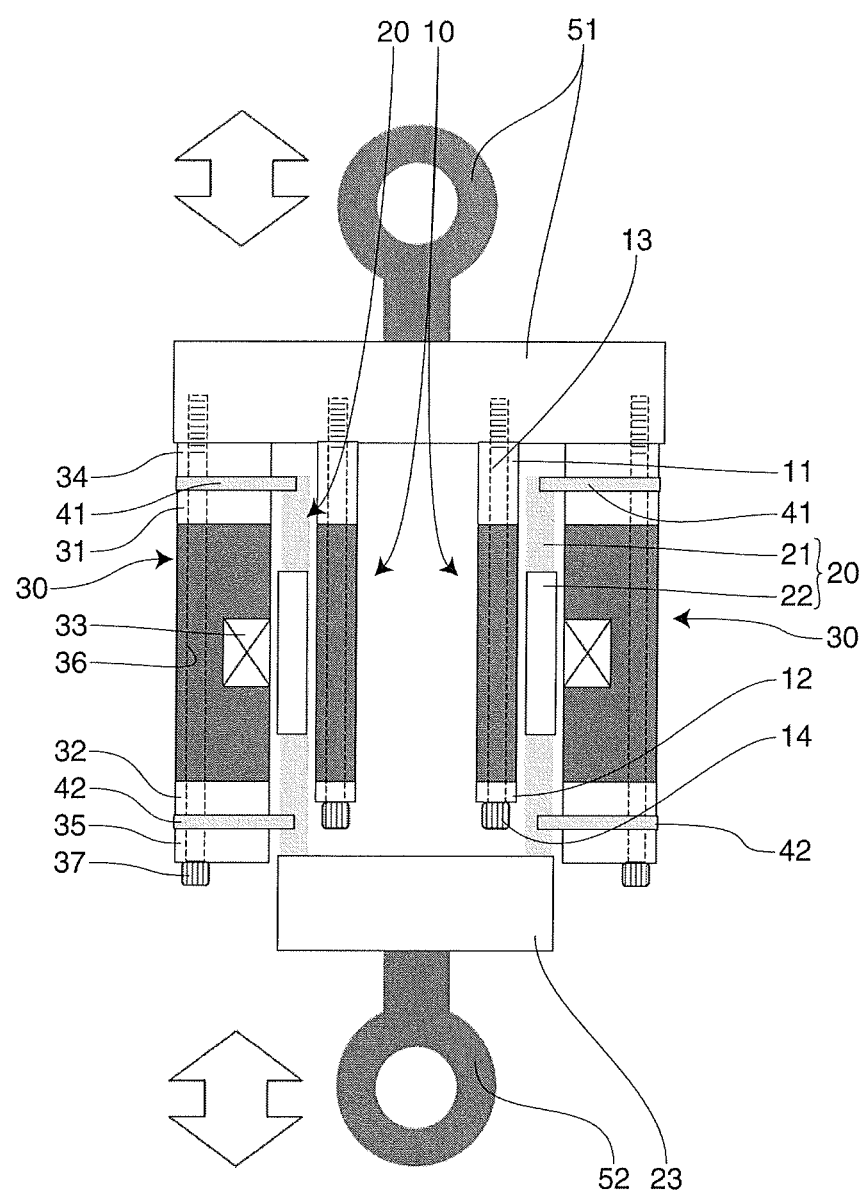
FIG. 3 is a schematic side sectional view of a vibration-based electric power generator according to another embodiment of the invention.

FIG. 3 is a schematic side sectional view of a vibration-based electric power generator according to another embodiment of the invention. The same symbols are allocated to the same members as those of the previous embodiments, and explanation thereof will be omitted.

In this embodiment, the inner yoke 10 and the outer yoke 30 are fixed to first structure-mounting portion 51 through the fastening bolts 14 and 37 respectively, and the piston movable-portion 23 is fixed to second structure-mounting portion 52.

That is, in this embodiment, inner yoke 10 and the outer yoke 30 are fixed to the first structure through the first structure-mounting portion 51, and the magnet holding member is fixed to a second structure through the piston movable-portion 23 and the second structure-mounting portion 52.

According to this embodiment, as a shock absorber, or by using the shock absorber, it is possible to utilize vibration or shock generated in a vehicle for generating electric power.

Figure 4:
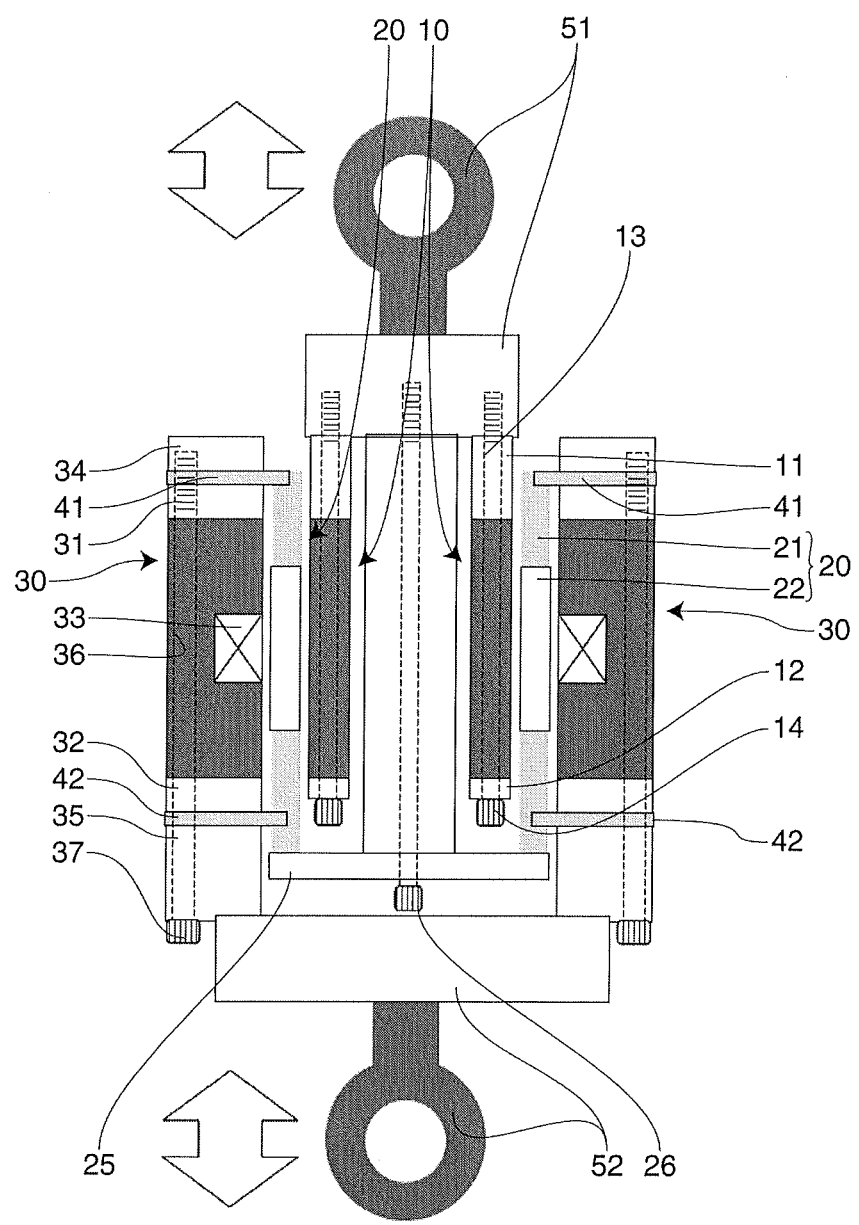
FIG. 4 is a schematic side sectional view of a vibration-based electric power generator according to another embodiment of the invention.

FIG. 4 is a schematic side sectional view of a vibration-based electric power generator according to another embodiment of the invention. The same symbols are allocated to the same members as those of the previous embodiments, and explanation thereof will be omitted.

In this embodiment, the inner yoke 10 and the piston-fixing portion 25 are fixed to the first structure-mounting portion 51 through the fastening bolts 14 and 26, respectively, and the outer yoke 30 is fixed to the second structure-mounting portion 52.

That is, in this embodiment, the inner yoke 10 and the piston-fixing portion 25 are fixed to the first structure by the first structure-mounting portion 51, and the outer yoke is fixed to the second structure by the second structure-mounting portion 52.

According to this embodiment, as a shock absorber, or by using the shock absorber, it is possible to utilize vibration or shock generated in a vehicle for generating electric power.

Figure 5:
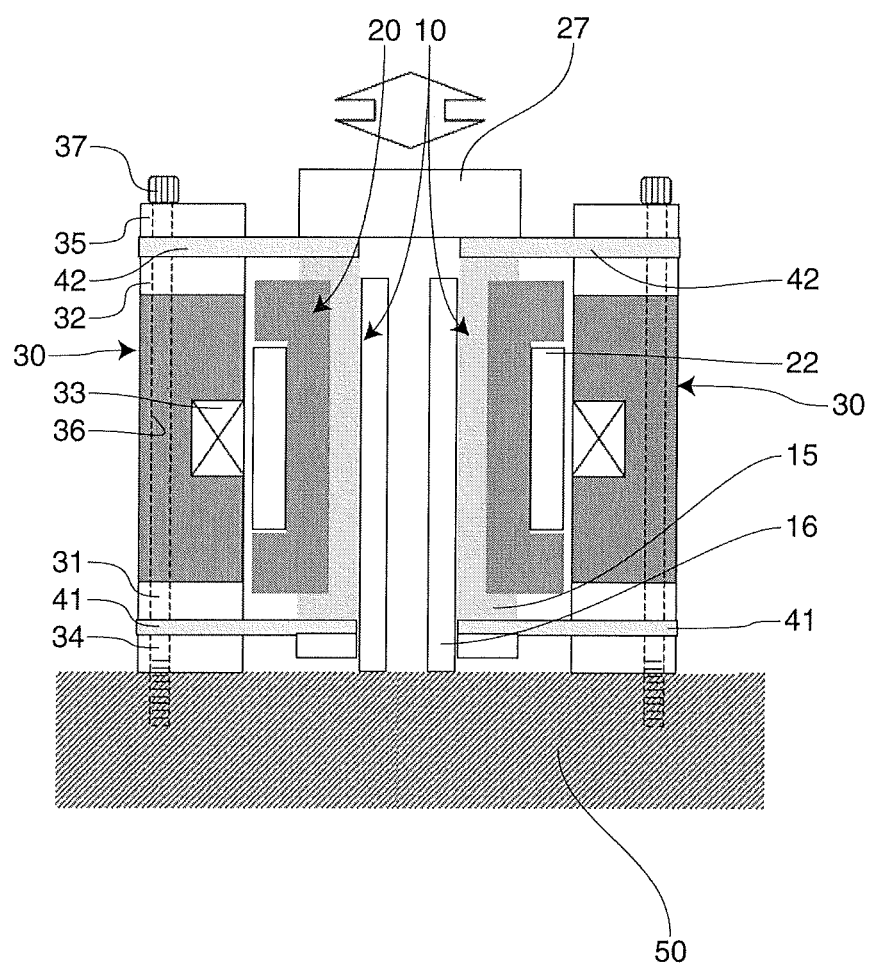
FIG. 5 is a schematic side sectional view of a vibration-based electric power generator according to another embodiment of the invention.

FIG. 5 is a schematic side sectional view of a vibration-based electric power generator according to another embodiment of the invention. The same symbols are allocated to the same members as those of the previous embodiments, and explanation thereof will be omitted.

The vibration-based electric power generator of this embodiment includes the cylindrical inner yoke 10 which holds a magnet 22 on its outer periphery, and the cylindrical outer yoke 30 disposed on an outer periphery of the inner yoke 10 at a predetermined distance therefrom.

A recess is formed in a cylindrical outer periphery of the inner yoke 10, and the magnet 22 is held in the recess. The inner yoke 10 includes a fastening portion 15, and both ends of the fastening portion 15 are fixed to the first support spring 41 and the second support spring 42 which are leaf springs. An inner periphery of the inner yoke 10 is provided with a cylindrical support portion 16 which prevents the inner yoke 10 from shaking in a radial direction. One end surface of the fastening portion 15 is provided with a movable portion 27.

The first support spring 41 and the second support spring 42 are mounted on the outer yoke 30 through fastening bolts 37.

According to this embodiment, the inner yoke 10 and the outer yoke 30 are connected to each other through the support springs 41 and 42, it is easy to adjust positions of the inner yoke 10 and the outer yoke 30, the inner yoke 10 and the outer yoke 30 are supported by the pair of support springs 41 and 42 to sandwich the inner yoke 10, and they can be operated at the time of operation such that the inner yoke 10 does not come into contact with the outer yoke 30.

In this embodiment, the outer yoke 30 is fixed to the structure 50, and the inner yoke 10 relatively reciprocates with respect to the outer yoke 30 by vibration of the structure 50, thereby generating electric power.

This embodiment can be utilized for a structure having a large vibration force as compared with a case where the magnet holding member 20 shown in FIG. 1 is made as a movable portion.

Figure 6:
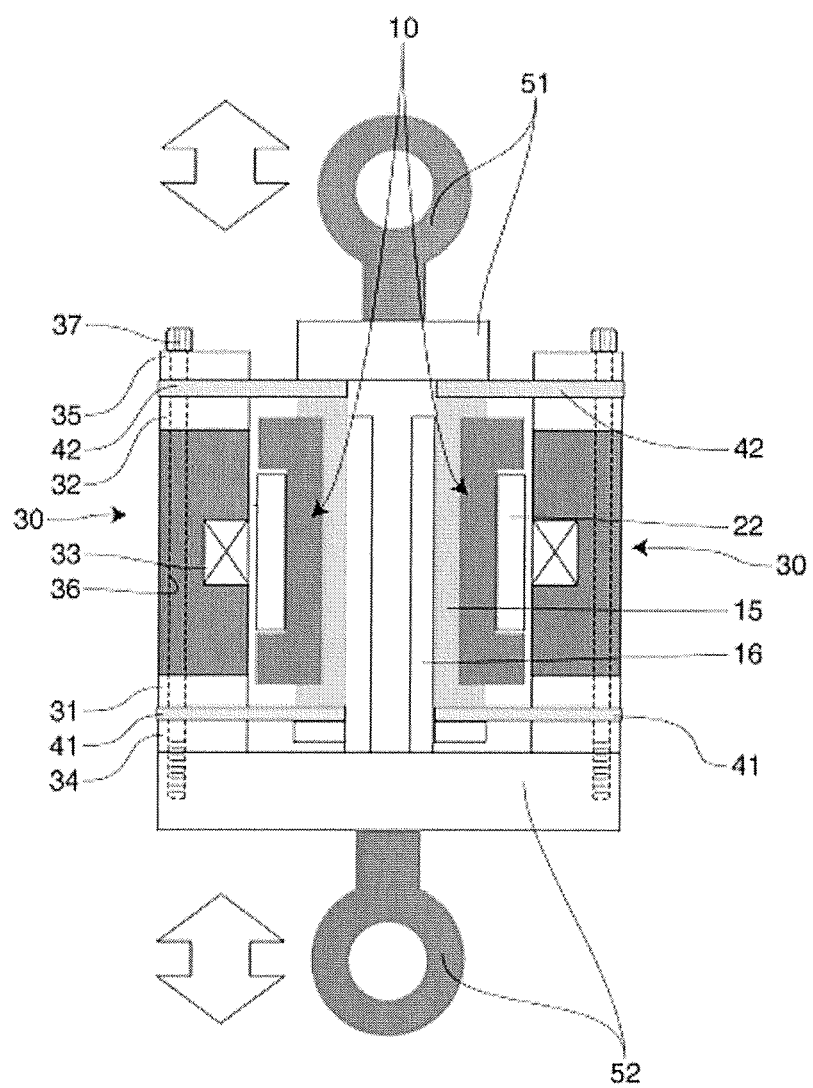
FIG. 6 is a schematic side sectional view of a vibration-based electric power generator according to another embodiment of the invention.

FIG. 6 is a schematic side sectional view of a vibration-based electric power generator according to another embodiment of the invention. The same symbols are allocated to the same members as those of the previous embodiments, and explanation thereof will be omitted.

In this embodiment, the inner yoke 10 is fixed to the first structure-mounting portion 51, and the outer yoke 30 is fixed to the second structure-mounting portion 52.

That is, in this embodiment, the inner yoke 10 is fixed to a first structure through the first structure-mounting portion 51, and the outer yoke 30 is fixed to a second structure through the second structure-mounting portion 52.

According to this embodiment, as a shock absorber, or by using the shock absorber, it is possible to utilize vibration or shock generated in a vehicle for generating electric power.

Figure 7:
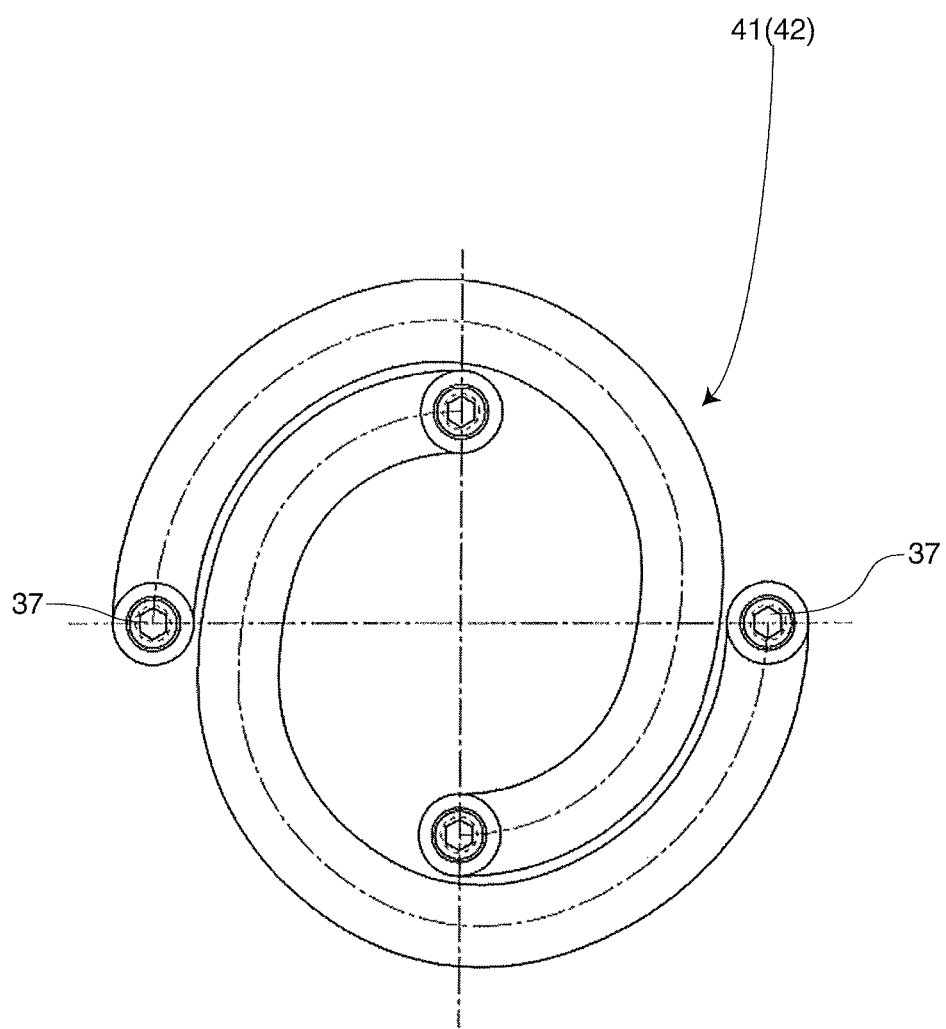
FIG. 7 is a plan view of support springs used in the embodiments shown in FIGS. 1 to 6.

FIG. 7 is a plan view of support springs used for the embodiment shown in FIGS. 1 to 6.

Each of support springs 41 and 42 has a substantially C-shape as viewed from above. These two members are disposed such that their phases are deviated from each other through 180°, fastening bolts 37 are disposed on ends of these members on the sides of their outer peripheries, and the magnet holding member 20 or the fastening portion 15 is disposed on ends of these members on the side of their inner peripheries.

Figure 8:
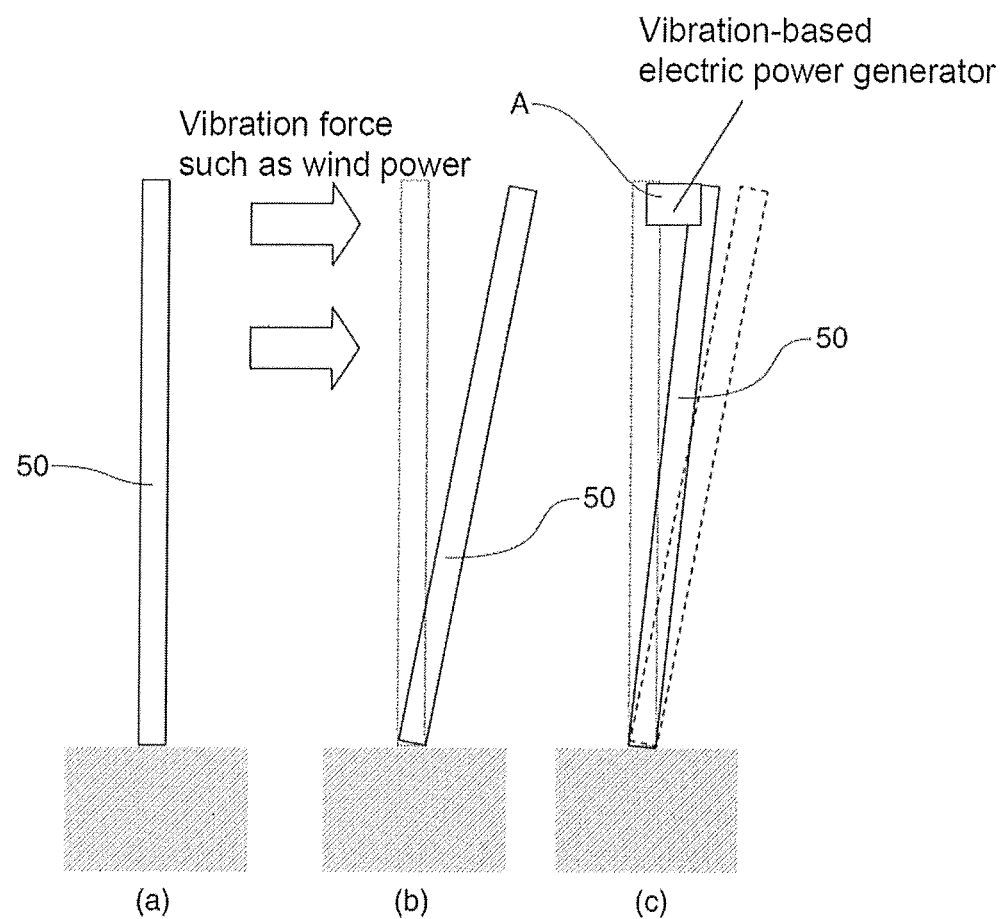
FIG. 8 are conceptual mounting diagrams of the vibration-based electric power generator onto a structure according to the invention.
Figure 9:
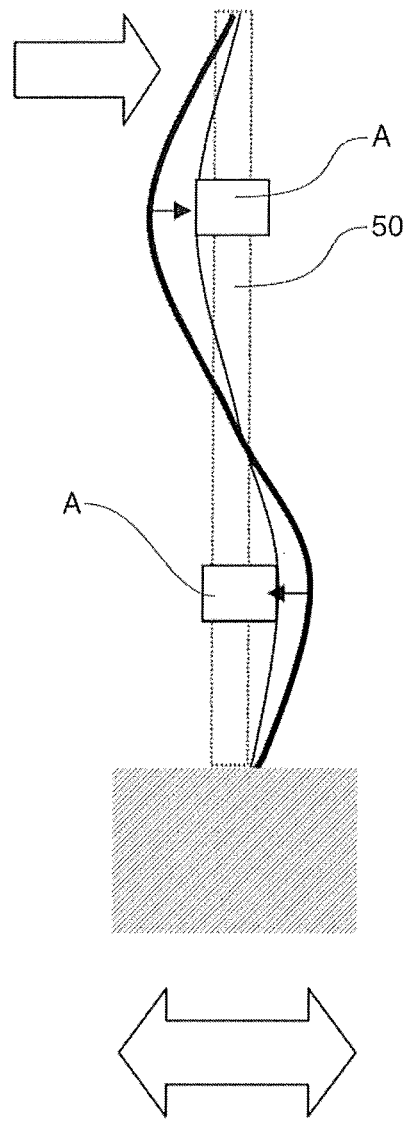
FIG. 9 is a conceptual mounting diagram of the vibration-based electric power generator onto a structure according to the invention.

FIGS. 8 and 9 are conceptual mounting diagrams of the vibration-based electric power generator onto a structure according to the invention.

FIG. 8 show a structure 50 such as a billboard, and show a case where a vibration-based electric power generator A of the present invention is disposed on the structure 50 which is not very high.

In the structure 50 shown in FIG. 8, swinging motion is generated in its upper portion by a vibration force such as wind power. Therefore, if the vibration-based electric power generator A is disposed on the upper end of the structure, swinging of the structure 50 can be utilized for generating electric power.

FIG. 9 shows a columnar structure 50 and shows a case where a vibration-based electric power generator A of the invention is disposed on the tall structure 50.

In the structure 50 shown in FIG. 9, swinging motion is generated by transmission of vibration of a vehicle or the like, but the tall structure 50 is provided with a resonance point. Therefore, if the vibration-based electric power generator A is disposed on a position having a large curve while taking the resonance point of the structure 50 into consideration, it is possible to utilize the swinging motion of the structure 50 for generating electric power.

INDUSTRIAL APPLICABILITY

The vibration-based electric power generator of the present invention is mounted on a structure such as a wall surface, a road sign, a vehicle body and a railway bridge for generating electric power utilizing swinging motion caused by vibration or wind power generated when a vehicle or a train runs.

The invention claimed is:

1. A vibration-based electric power generator comprising:
a cylindrical inner yoke;
a cylindrical magnet holding member disposed on an outer periphery of the inner yoke at a predetermined distance therefrom; and
a cylindrical outer yoke disposed on an outer periphery of the magnet holding member at a predetermined distance therefrom, wherein
one end of the magnet holding member and one end of the outer yoke are connected to each other through a first support spring that is a leaf spring, and
an other end of the magnet holding member and an other end of the outer yoke are connected to each other through a second support spring that is a leaf spring;
fastening bolts adapted to mount the generator to a vibration source, wherein the fastening bolts are respectively disposed on the inner yoke and the magnet holding member; and the outer yoke is supported by the magnet holding member through the first support spring and the second support spring, and the outer yoke is movable in a reciprocating manner.

2. A vibration-based electric power generator comprising:
a cylindrical inner yoke;
a cylindrical magnet holding member disposed on an outer periphery of the inner yoke at a predetermined distance therefrom;

a cylindrical outer yoke disposed on an outer periphery of the magnet holding member at a predetermined distance therefrom, wherein
    one end of the magnet holding member and one end of the outer yoke are connected to each other through a first support spring that is a leaf spring, and
    an other end of the magnet holding member and an other end of the outer yoke are connected to each other through a second support spring that is a leaf spring; and
fastening bolts adapted to mount the generator to a vibration source, wherein the fastening bolts are respectively disposed on the inner yoke and the magnet holding member, the vibration source includes a first structure-mounting portion and a second structure-mounting portion, the first structure-mounting portion and the second structure-mounting portion are opposite to each other in a direction from the one end of the outer yoke to the other end of the outer yoke, and the generator is configured so that the inner yoke and the magnet holding member can be fixed to the first structure-mounting portion of the vibration source and the outer yoke can be fixed to the second structure-mounting portion of the vibration source.

* * * * *